US012785319B2

(12) United States Patent
Bussmann

(10) Patent No.: US 12,785,319 B2
(45) Date of Patent: Nov. 3, 2026

(54) ELECTRICAL DEVICE, DEVICE CONNECTION PART FOR THE ELECTRICAL DEVICE, AND METHOD FOR MANUFACTURING AN ELECTRICAL DEVICE

(71) Applicant: HARTING ELECTRONICS GMBH, Espelkamp (DE)

(72) Inventor: Rainer Bussmann, Bad Essen (DE)

(73) Assignee: HARTING ELECTRONICS GMBH, Espelkamp (DE)

( * ) Notice: Subject to any disclaimer, the term of this patent is extended or adjusted under 35 U.S.C. 154(b) by 628 days.

(21) Appl. No.: 18/271,647

(22) PCT Filed: Jan. 13, 2022

(86) PCT No.: PCT/DE2022/100026

§ 371 (c)(1),
(2) Date: Jul. 10, 2023

(87) PCT Pub. No.: WO2022/161576

PCT Pub. Date: Aug. 4, 2022

(65) Prior Publication Data

US 2024/0055795 A1 Feb. 15, 2024

(30) Foreign Application Priority Data

Feb. 1, 2021 (DE) ..................... 10 2021 102 252.5

(51) Int. Cl.
*H01R 13/504* (2006.01)
*H01R 13/73* (2006.01)
(Continued)

(52) U.S. Cl.
CPC ........... *H01R 13/504* (2013.01); *H01R 13/73* (2013.01); *H01R 43/18* (2013.01); *H01R 43/24* (2013.01)

(58) Field of Classification Search
CPC .... H01R 13/504; H01R 13/73; H01R 13/405; H01R 13/41
(Continued)

(56) References Cited

U.S. PATENT DOCUMENTS 4,399,836 A * 8/1983 de Versterre ........ F15B 13/0835 251/129.05
4,588,239 A * 5/1986 Venaleck ............. H05K 7/1092 439/736
(Continued)

FOREIGN PATENT DOCUMENTS

DE 29607525 U1 * 8/1996
DE 10256374 7/2004 ........... H01R 13/502
(Continued)

OTHER PUBLICATIONS

DE102006051281A1 translation (Year: 2008).*
(Continued)

*Primary Examiner* — Marcus E Harcum
(74) *Attorney, Agent, or Firm* — HAYES SOLOWAY P.C.

(57) ABSTRACT

An electrical device includes a device housing; at least one circuit carrier having electrical conducting tracks; and a plurality of plug connectors, each of which includes a contact carrier having a plurality of contact chambers extending all the way through and comprises a plurality electrical plug contacts. The plug contacts each have, at their plugging-side end, a plugging region for the plugging-side connection to the mating contacts of a mating plug plugged to the plug connector in question and each have, at their connection-side end, a connection region (23), at which the plug contacts are electrically connected to the conducting tracks of the circuit carrier. Each plug contact is at least partly received in one of the contact chambers of the contact carrier in question and is retained therein. The electrical device also has a device connection part, which forms a
(Continued)

housing part of the device housing, the device connection part being integral with the contact carriers.

20 Claims, 5 Drawing Sheets

(51) Int. Cl.
*H01R 43/18* (2006.01)
*H01R 43/24* (2006.01)
(58) Field of Classification Search
USPC ...................... 439/540.1, 650, 652, 736, 731
See application file for complete search history.

(56) References Cited

U.S. PATENT DOCUMENTS 4,795,372 A * 1/1989 Kobler ............... H01R 13/5221 439/736
5,125,854 A * 6/1992 Bassler ................ H01R 13/514 439/640
5,192,226 A * 3/1993 Wang ..................... H01R 31/02 439/639
5,308,258 A * 5/1994 Hatsios .................. H01R 24/84 439/465
5,421,747 A * 6/1995 Agnihotri ................ H01R 9/24 439/736
6,213,815 B1 * 4/2001 Wu ........................ H01R 27/02 439/502
6,217,393 B1 * 4/2001 Muta ...................... H01R 43/24 439/736
6,241,562 B1 * 6/2001 Benda .................. H01R 13/514 439/668
6,386,891 B1 * 5/2002 Howard ................. H01R 12/52 439/76.1
6,527,599 B2 * 3/2003 Bechtold ................ H01R 27/02 439/736
6,634,910 B2 * 10/2003 Lieb ..................... H05K 7/1465 439/949
7,066,767 B2 * 6/2006 Liao ....................... H01R 27/02 439/639
7,198,524 B2 * 4/2007 Tsugane ................. H01R 43/16 439/736
7,255,610 B2 * 8/2007 Oohashi .............. B29C 45/1671 264/272.17
7,670,190 B2 * 3/2010 Shi ......................... H01R 24/58 439/640
7,753,740 B2 7/2010 Carolis et al. ................ 439/717
8,075,322 B2 * 12/2011 Schwettmann ........ H01R 11/28 439/82
8,167,629 B2 * 5/2012 Ito ........................ H01R 12/724 439/736
8,221,160 B2 * 7/2012 Liu .................... H01R 13/6596 439/76.1
8,267,722 B2 * 9/2012 Zhou .................. H01R 13/6582 439/607.25
8,545,270 B2 * 10/2013 Yu .......................... H01R 24/20 439/540.1
8,811,814 B2 * 8/2014 Warren .................. H04N 23/57 348/374
9,480,181 B2 * 10/2016 Lindkamp .............. H05K 5/006
2001/0027066 A1 * 10/2001 Loh ...................... H01R 13/514 439/652
2002/0142672 A1 10/2002 Bechtold et al. ............. 439/736
2005/0095922 A1 * 5/2005 Berg ...................... H01R 43/18 439/736
2008/0124987 A1 * 5/2008 Chow .................... H05K 5/065 439/736
2009/0023320 A1 1/2009 De Carolis et al. .......... 439/190
2009/0197478 A1 * 8/2009 Mandel ................ H05K 5/0034 439/736
2010/0146182 A1 6/2010 Gutekunst et al. ........... 710/305
2011/0244735 A1 * 10/2011 Chen .................... H01R 12/724 439/731
2012/0289074 A1 * 11/2012 Chang .................. H01R 13/627 439/325
2013/0137310 A1 5/2013 Genau .................... H01R 12/70
2014/0364008 A1 * 12/2014 Simmel ................ H01R 13/514 439/607.23
2015/0044903 A1 * 2/2015 Gruber ..................... H05K 5/03 439/540.1
2015/0118915 A1 * 4/2015 Friess .................... H01R 43/18 439/736
2018/0088563 A1 3/2018 Gutekunst et al. .......................... G05B 19/41845
2019/0115686 A1 * 4/2019 Koelle ................... B23K 26/28
2019/0273343 A1 9/2019 Ruf et al. ............. H01R 13/658

FOREIGN PATENT DOCUMENTS

DE 102006051281 4/2008 ............. H01R 25/00
DE 102008060006 5/2010 ............. H04L 12/02
DE 102009003705 A1 * 10/2010 ............. H01R 39/64
DE 102010051954 2/2012 ......... H01R 13/6586
DE 102018104843 9/2019 ............... H01R 4/64
EP 1291983 B1 * 5/2008 ......... H01R 12/7088
EP 3240382 2/2020 ............... H05K 7/14
GB 2323980 A * 10/1998 ........... H05K 5/0039
WO 2016/155685 10/2016 ............. H04L 12/40

OTHER PUBLICATIONS

International Search Report and Written Opinion issued in PCT/DE2022/100026, dated May 30, 2022, with English translation, 21 pages.
Search Report issued German Patent Appln. No. 10 2021 102 252.5, dated Dec. 23, 2021, with machine English translation, 10 pages.
International Preliminary Report on Patentability issued in PCT/DE2022/100026, dated Aug. 10, 2023, with English translation, 10 pages.

* cited by examiner

ELECTRICAL DEVICE, DEVICE CONNECTION PART FOR THE ELECTRICAL DEVICE, AND METHOD FOR MANUFACTURING AN ELECTRICAL DEVICE

CROSS REFERENCE TO RELATED APPLICATIONS

This application is a US National Phase of PCT International Patent Application Serial No. PCT/DE2022/100026, filed Jul. 10, 2023, which claims priority to German Patent Application Serial No. 102021102252.5, filed Feb. 1, 2021, the contents of which are incorporated herein by reference.

BACKGROUND OF THE INVENTION

In the construction of electrical devices, the installation of plug connectors in the device housings thereof raises the fundamental issue of manufacturing tolerances in the components involved. In particular, this issue is exacerbated if structural tolerances are cumulative. In consequence, in the absence of corresponding countermeasures, mechanical stresses can be generated between a circuit carrier (e.g. a circuit board) of the electrical device, to which the plug connectors and their associated plug contacts are connected, and the device housing, resulting in strain in the circuit carrier and the potential impairment of its long-term operation.

A sub-aspect of published document EP 3 240 382 B1 addresses the floating mounting of a circuit carrier in a device housing. However, this method is not appropriate for the installation of a plurality of plug connectors in the device housing, as different tolerances may apply to the individual plug connectors.

Published document DE 10 2010 051 954 B3 describes an angled plug connector. On the terminal side, this is secured to a circuit board and, on the plug-in side, is inserted in a "floating" arrangement in a protective shell of a front panel insert. The increased complexity of assembly is disadvantageous, as is the increased difficulty of ground connection which, in this case, is executed by means of a separate shielding spring. Sealing of the device housing against humidity and soiling is at least impaired as a result. Moreover, it is particularly problematic that, in this manner, unavoidable insertion and withdrawal forces are applied directly to the circuit board terminals upon the plug-in of a mating connector.

Moreover, the design and function of I/O terminal boxes are known from published documents DE 10 2018 104 843 A1, WO 2016/155685 A1 and DE 102008 060006 B4.

According to the prior art, component-relating manufacturing tolerances generate increased complexity in the assembly of a plurality of plug connectors in an electrical device, for example in a terminal device for a data network.

The German Patent and Trademark Office, in the priority application to the present application, has searched the following prior art: US 2002/0 142 672 A1, U.S. Pat. No. 7,753,740 B2 and DE 102 56 374 B3.

SUMMARY OF THE INVENTION

The invention relates to an electrical device of the generic type.

The invention further relates to a device connection part for the electrical device.

The invention further proceeds from a method for manufacturing an electrical device, particularly the above-mentioned electrical device.

The electrical device can be employed for the reception and processing of analog and/or digital electrical signals, and/or for the conversion and/or relaying thereof. In particular, the electrical device can be a terminal device for a data network, particularly preferably an "I/O link module", which is also described hereinafter as an I/O terminal box.

The device connection part forms a device housing part, particularly a device housing upper shell of a device housing of the electrical device, and is required, inter alia, as a constituent of the electrical device for the carriage of the plug connectors thereof, thus permitting the electrical plug contacts thereof to be led out of the electrical device, e.g. as an interface for external data traffic. In this manner, the device connection part can be employed as a network interface for connected components and, to this end, comprises a plurality of plug connectors, in order to permit the connection of components which are connected thereto, e.g. to a data network. Via the data network, by means of its plug connectors, the device can particularly connect field devices such as sensors and actuators, for example to a control apparatus.

The object of the invention, in the manufacture of an electrical device, particularly of a terminal device for a data network, is a reduction in the complexity of assembly required to integrate a plurality of plug connectors, in the form of built-in plug connectors, in the electrical device.

The above-mentioned plurality of plug connectors can be at least four, preferably at least six, particularly preferably at least eight and, in particular, even ten or more.

An electrical device has a device housing, at least one circuit carrier, which is preferably a circuit board, and a plurality plug connectors, each comprising a contact carrier having a plurality of uninterrupted contact chambers and a plurality of electrical plug contacts. Each of the plug contacts is respectively accommodated, at least partially, in one contact chamber of the respective contact carrier and is retained therein, and preferably secured therein, particularly by latch fastening.

The circuit carrier has a plurality of conducting tracks and, in particular, a plurality of through-contacts for electrically conductive contact-connection, i.e. electrically conductively-coated through-openings.

Each of the plug contacts, at its plug-in end, comprises a plug-in region which can be configured, for example, in the form of a pin contact or socket contact, and further comprises, at its terminal end, a terminal region for electrical contact-connection with the conducting tracks of the circuit carrier. The terminal region can preferably be configured in the form of a terminal pin, particularly a press-in pin or, alternatively, can be configured in the form of a soldering pin, or can at least comprise such a pin.

At their terminal region, the plug contacts are connected to the conducting tracks of the circuit carrier in an electrically conductive manner, particularly by the insertion of the press-in pins thereof into the through contacts and/or by the plugging of the soldering pins thereof into the through-openings of the circuit carrier and soldering to the electrically conductive coating thereof.

The electrical device has a device connection part. This device connection part forms a device housing part, is thus an element of the device housing and, in combination with a preferably one-piece housing base component, can form the above-mentioned device housing of the electrical device.

In particular, the device connection part forms at least one outer wall, preferably an upper shell of the device housing.

The above-mentioned plurality of plug connectors can be at least four, preferably at least six, particularly preferably at least eight and, in particular, can even be ten or more.

According to the invention, the device connection part, as a device housing part, is configured integrally with the above-mentioned contact carriers.

The electrical device is preferably a terminal device for a data network, particularly an I/O terminal box. To this end, the electrical device advantageously comprises at least one data network terminal.

The device connection part is comprised of an electrically insulating material, particularly a plastic. The device connection part further comprises a plurality of contact carriers, each of which is associated with a plug connector. These contact carriers are also formed of an electrically insulating material, and are preferably comprised of plastic. The contact carriers are respectively provided for the retention of associated plug contacts and, to this end, each comprise the above-mentioned uninterrupted contact chambers, into which the electrical plug contacts are insertable, and in which the latter are preferably fixable and, in particular, are latchable. The electrical plug contacts are employed, on their terminal side, for electrically conductive connection with the conducting tracks of the circuit carrier, particularly the circuit board of the electrical device, and are further employed, at their plug-in region, for connector-side contact-connection with mating electrical contacts of a mating connector which is plugged or pluggable into the respective plug connector. The device connection part has an essentially planar terminal section, onto which the contact carriers are molded at their respective position.

The device connection part can preferably be produced in combination with the contact carriers as a single injection-molded part, particularly in a single injection-molding process. The plug contacts can thus be over-molded or, further to the injection-molding process, can be enclosed in the contact chambers of the contact carriers in a separate process step, particularly mechanically. The latter is particularly advantageous, on the grounds of reduced complexity of manufacture.

A method for manufacturing an electrical device, particularly the above-mentioned electrical device, comprises at least the following steps:

A. Production of an injection-molding tool for a series of device connection parts;
B. Injection-molding of at least one device connection part as a one-piece injection-molded part, which comprises both a terminal section and contact carriers which are molded thereupon at their respective position;
C. Gauging of the relative position of the contact carriers of the at least one device connection part with respect to one another;
D. Determination of appropriate terminal positions on the circuit carrier from measurement data established in process step C, and the formation of at least one circuit carrier, with conducting tracks and through-contacts which are connected thereto in an electrically conductive manner, at the terminal positions thus determined.

Process step B can preferably be executed in a single injection-molding step. The circuit carrier can preferably be a circuit board.

In a preferred configuration, in process step B, accordingly, at least two, preferably at least three, and thus, for example, at least four or more device connection parts are produced by the injection-molding process and are gauged in process step C. In process step D, a statistical evaluation of measurement results can be executed, and employed as a basis for the determination of appropriate terminal positions.

In process step C, the margin of measuring accuracy can be less than 1 mm, preferably less than 0.5 mm, particularly preferably less than 0.25 mm and, in particular, less than 1.25 mm, i.e. for example less than 1 mm or even more accurate, thus, for example, less than 0.75 mm or even less than 0.05 mm.

Advantageous configurations of the invention are disclosed in the sub-claims and in the following description.

A major advantage of the invention is the simplification of assembly associated with the manufacture of the electrical device. Ultimately, it is not necessary for a plurality of contact carriers to be positioned individually on the circuit carrier and, for each individual contact carrier, a separate plug connector housing to be fitted to an outer wall of the device housing.

A significant advantage of the invention is the elimination of the necessity for any variable tolerance equalization between the circuit carrier and the device housing, and particularly between the individual contact carriers, which are connected to the circuit carrier by means of their plug contacts, and the device housing.

An additional advantage is provided in that insertion and withdrawal forces associated with the plug-in and withdrawal of a mating connector are maintained at a distance from the circuit carrier, particularly from the circuit board.

A further advantage of the method is provided in that a particularly effective and uncomplex assembly and sealing of the device housing, with the simultaneous integration of a plurality of plug connectors, are permitted.

The method is particularly advantageous, on the grounds that customary and cost-effective injection-molding methods are generally not appropriate for the achievement of the accuracies required for the population of circuit boards by the "press-in" method, or by an appropriate soldering method. Ultimately, these contact-connection methods require the highly accurate positioning of through-contacts in the circuit carrier.

In an appropriate soldering method, for the purposes of assembly, it is necessary for the soldering pin of the respective plug contact to be led through the through-opening of the circuit carrier, particularly of the circuit board, and then soldered from the rear, i.e. from the side which is averted from the contact carrier.

The above-mentioned press-in method is employed for solderless contact-connection by means of metallic electrical plug contacts, and will be familiar to a person skilled in the art, for example from published document DE 10 2013 209 407 A1, and from numerous comparable publications and practical applications.

The manufacturing process of the electrical device is continued by the following steps:

E. Injection-molding of device connection parts using the injection-molding tool, and population of contact carriers with plug contacts, and the production of circuit carriers, particularly of circuit boards, according to the terminal positions determined in process step D;
F. Terminal-side electrical contact-connection of plug contacts with the circuit carrier, particularly the circuit board, and fastening of the circuit carrier, particularly of the circuit board, to the device connection part, G. Respective joining of the device connection parts to a housing base part of the device housing, wherein the circuit carrier, particularly the circuit board, is arranged in the device housing.

As indicated above, in process step F, electrical contact-connection of the plug contacts with the circuit carrier can preferably be executed by a solderless press-in method or, alternatively, by a soldering method. In the case of the soldering method, the circuit carrier, at its contact points, is provided with the above-mentioned through contacts, such that the soldering pins of the plug contacts, as mentioned above, are plugged through from the terminal side, and can be soldered to the circuit carrier from the rear. In each of these two variants, it is advantageous if the through-openings of the circuit-carrier are positioned as accurately as possible. In particular, the accuracy of this positioning can assume the above-mentioned margin of less than 1 mm, preferably less than 0.5 mm, particularly preferably less than 0.25 mm and, in particular, less than 1.25 mm i.e., for example, less 0.1 mm, or even more accurate, i.e., for example, less than 0.75 mm, or even less than 0.05 mm.

In a particularly preferred embodiment, the circuit carrier, in particular a circuit board, is fastened to the device connection part. To this end, the device connection part can incorporate a fastening apparatus. The device connection part can be integrally embodied with this fastening apparatus. The fastening apparatus can be molded onto the device connection part and, in particular, can be produced in combination with the latter by the above-mentioned injection-molding process. This provides the advantage of a reduced complexity of manufacture.

The fastening apparatus can be comprised of a plurality of fastening studs.

At their end, the fastening studs can comprise a tapering, in particular a cone-shaped clamping section. In a potential embodiment, the clamping section can also be configured with a cruciate cone shape. The circuit carrier, particularly the circuit board, can comprise an associated e.g. circular clamping recess. By the terminal-side pressing-in or soldering of the plug contacts to the circuit board, the terminal regions of the plug contacts are customarily inserted through the through-contacts in the circuit board. At the same time, the fastening studs, at their tapering clamping section, can engage in the respective clamping recess of the circuit carrier, particularly of the circuit board and can be clamped therein, thus retaining and securing the circuit board in its appropriate position on the device connection part. This variant is particularly advantageous, as the complexity of assembly involved is extremely low.

These fastening studs can be molded onto the device connection part and, particularly by an injection-molding process, can be formed as an integral injection-molded component with a further device connection part.

In another configuration, the fastening apparatus, particularly the fastening studs, can comprise one or more separate parts. This provides an advantage, in that the clearance between the device connection part and the circuit carrier, particularly the circuit board, is not dictated by the device connection part. For example, the fastening apparatus can be comprised of spacing studs, the length of which corresponds to the respective requirement in force. Clearance can thus be varied with limited complexity, without the necessity for the modification of the injection-molding tool.

The employment of fastening studs provides the advantage of the simplification of assembly. In particular, in the conduct of process step F, the following two steps can be executed simultaneously:

F1.) for electrical contact-connection, the terminal regions of the plug contacts are led through the through-contacts in the respective circuit carrier, by a press-in or subsequent soldering arrangement and, at the same time F2.) fastening studs which are molded onto or applied to the device connection part respectively engage in an associated clamping recess in the respective circuit carrier, and are clamped therein.

During the assembly of the electrical device, the device connection part can be arranged on or fitted to the housing base part of the device housing, and fastened thereto in a sealed arrangement, thus forming the device housing of the electrical device in combination with the housing base part. At the same time, the circuit carrier, which is preferably fastened to the device connection part, can be arranged in or on the device housing.

In the event that a new or further injection-molding tool is required for the same design of device connection part, for example in order to increase the number of pieces produced, the same circuit carriers, particularly circuit boards, can nevertheless continue to be employed. Ultimately, the "shrinkage" of injection-molded parts produced by the same injection-molding tools also remains the same. The term "shrinkage" is understood as the reduction in the dimensions of the injection-molded part vis-A-vis the dimensions of the void in the injection-molding tool.

This method is particularly advantageous on the grounds that, in principle, the positioning of through-openings on the circuit carrier, particularly on the circuit board, can be achieved by production engineering with significantly greater accuracy—or the targeted accuracy is at least associated with significantly lower complexity—than the positioning of the contact carrier on the device connection part.

Moreover, the device connection part, as an element of the device housing, can cover at least 10%, preferably at least 15%, particularly at least 20%, and preferably at least 25% of the total surface of the device housing, and can thus form at least a complete device housing wall, particularly a device housing cover and, particularly preferably, the above-mentioned device housing upper shell.

In a particularly advantageous configuration, the terminal section occupies the majority, i.e. more than half, particularly more than 66%, preferably even more than 75%, and particularly preferably even more than 80% of the surface area of the device connection part. At at least one, and preferably at more than one end, the device connection part can comprise a corner or a curvature, and can thus additionally form at least part of a respective sidewall of the device housing, particularly oriented at right angles to the terminal section. This is particularly advantageous for the stability and sealing of the device housing. A further simplification of assembly is additionally provided, as the number of separate parts of the device housing can be reduced accordingly.

In a preferred configuration, the contact carriers, in their respective position, are molded onto the terminal section of the device connection part in a recessed arrangement. This is not only advantageous on mechanical grounds, for example in the interests of space-saving, but is also consistent, for example in applications using I/O terminal boxes (I/O link modules), with customary practices in automation technology.

To this end, it is advantageous if the device connection part, at the respective positions at which the contact carriers are located, respectively comprises, in particular, an essentially hollow cylindrical recess. In this recess, particularly on the inner wall of the hollow cylinder, the device connection part can respectively comprise at least one interlocking device for the mating connection, for example a latching element such as a continuous or interrupted locking edge and/or an undercut, and or an internal thread by way of a screw-on thread. The screw-on thread can optionally be continuous or segmented.

Within this recess, the contact carrier can be configured in a recessed arrangement. For example, it can continuously connected to the further device connection part by means of, in particular, an annular connecting web which is circumferentially molded onto the inner side of the recess at the device-side end thereof.

The contact carriers form an element of circular plug connectors. Although these can be "M12" circular plug connectors, it is naturally possible for other circular plug connectors with different thread gauges to be employed, for example "M8" circular plug connectors.

The designation "M" indicates that, in the interlocking mechanism of the circular plug connector concerned, optionally, a "metric" screw-in thread is provided, wherein the diameter of the respective screw-in thread is definable in whole-number metric units (in this case, millimeters). A M12 thread is characterized, for example, in that it has a diameter of 12 mm, and a M8 thread is characterized in that it has a diameter of 8 mm.

Naturally, however, other circular plug connectors having screw-in threads of different diameters, which can also be expressed e.g. in inches, can also be employed.

In additional configurations, plug connectors, alternatively or additionally to a screw thread, can also comprise other interlocking mechanisms, for example lugs, latching lugs and/or undercuts, e.g. for the latching of mating connectors which comprise a push-pull latching mechanism or similar.

In a preferred further development, the device connection apparatus, preferably in its terminal section, additionally comprises further circular mounting openings for the fitting of further plug connectors which can be employed, for example, for the supply of power and/or for network connection, or for any other application, the respective employment of which is adaptable in a correspondingly flexible and interchangeable manner.

BRIEF DESCRIPTION OF THE DRAWINGS

An exemplary embodiment of the invention is represented in the drawings, and is described in greater detail hereinafter. In the drawings.

DETAILED DESCRIPTION OF THE INVENTION

The figures show partially simplified schematic representations. In part, the same reference numbers are employed for equivalent, but not necessarily identical elements. Different views of the same elements can be differently scaled.

Figure 1A:
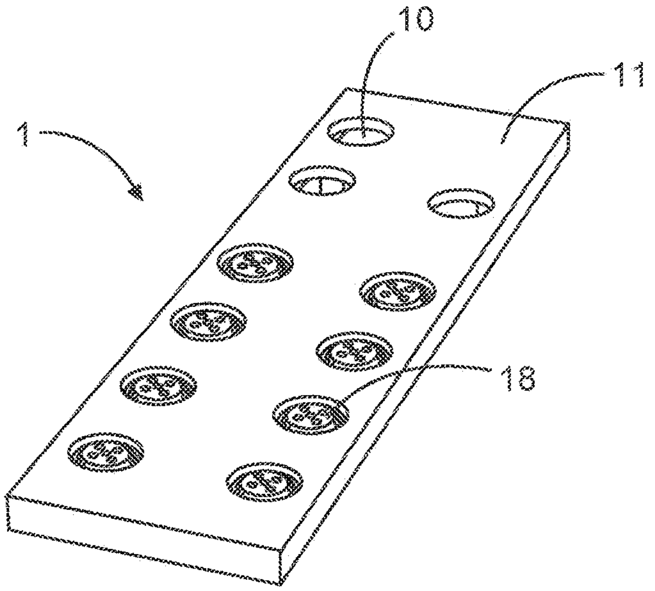
FIG. 1*a* shows a perspective representation of a device connection part having eight contact carriers molded thereupon.

FIG. 1*a* shows an oblique overhead view of a device connection part 1 having eight contact carriers 18 configured in a recessed arrangement in a planar terminal section 11 of the device connection part 1. The term "recessed arrangement" signifies that the contact carriers 18 are located in hollow cylindrical recesses 12, which are described hereinafter. The contact carriers 18 are essentially configured with a cylindrical shape, and each comprises a plurality of uninterrupted contact chambers 180.

Three circular mounting openings 10 are further arranged in the terminal section 11, which are provided for the installation of further plug connectors. These further plug connectors can be employed, for example, for the supply of power and/or for a network connection, or for any other application. They are provided as separate parts, and are correspondingly adaptable to the respective application of the electrical device, in a flexibly adaptable and interchangeable manner.

Figure 1B:
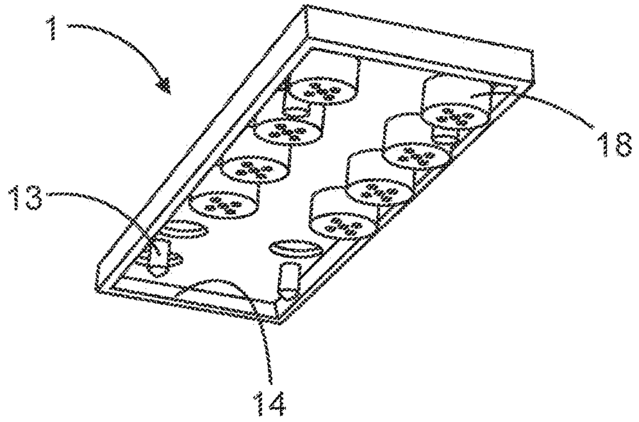
FIGS. 1*b, c* show different views of the device connection part.
Figure 1C:
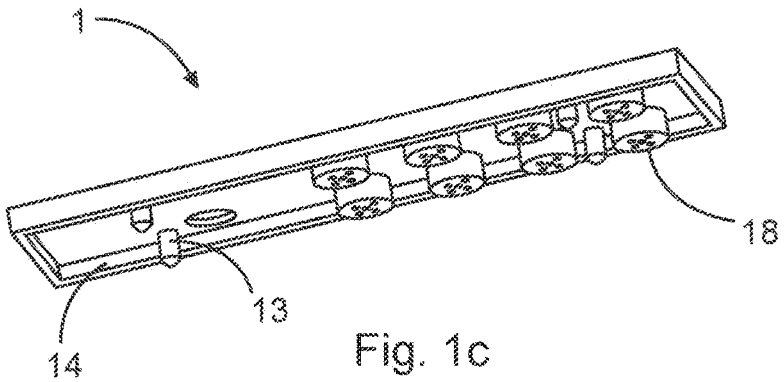

FIGS. 1*b* and 1*c* show the device connection part 1, in a view of the interior side of the device. From this view, it is clear that the contact carriers 18—apart from their uninterrupted contact chambers 180 are not only closed on the terminal side, but also on the device side.

The device connection part 1 further comprises, on the interior side of the device, a plurality of fastening studs 13 which are molded thereupon and, at the outer edges of the terminal section 11, a circumferential collar 14. By means of the collar 14 and the terminal section 11, the device connection part 1 forms an upper shell of the device housing 140 which is illustrated hereinafter.

Figure 2A:
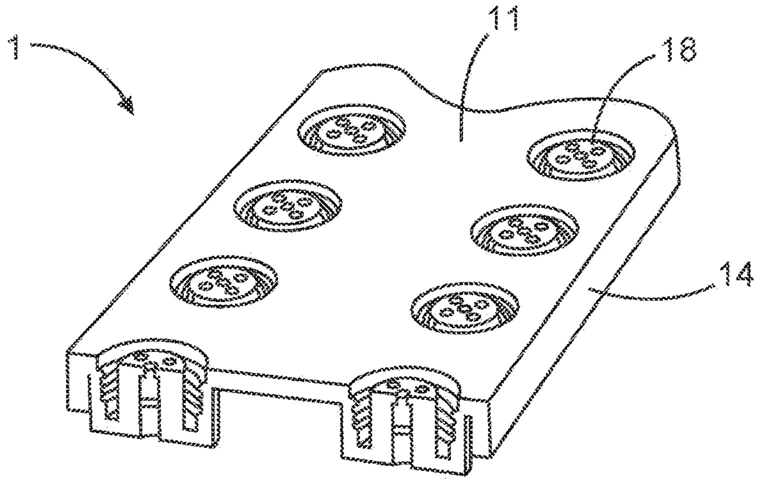
FIG. 2*a* shows the device connection part in a sectional view running through two of the contact carriers.

FIG. 2*a* shows a sectional representation of the device connection part 1 in an oblique overhead view, in section through two of its contact carriers 18, wherein the line of section is a mid-line through the contact chambers 180.

Figure 2B:
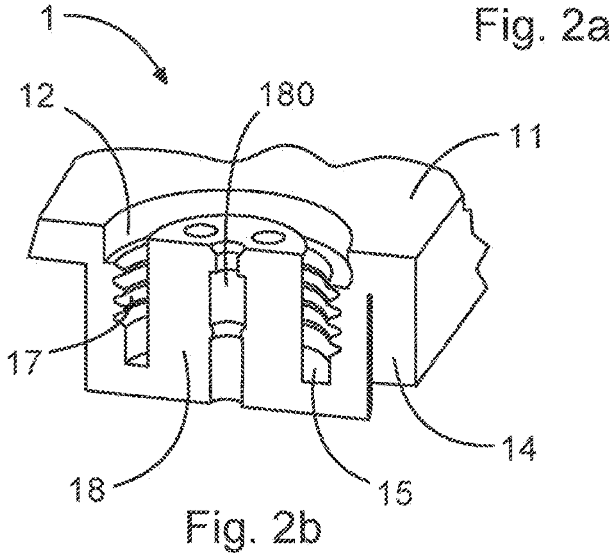
FIG. 2*b* shows an enlargement of the device connection part, having a contact carrier represented in section.

FIG. 2*b* shows an enlarged section of the above. In this representation, it can be seen particularly clearly that the molded-on contact carriers 18 which are recessed in the terminal section 11 are continuously connected to the further device connection part 1 by means of an annular connecting web 15 which is circumferentially molded onto the inner side of the hollow cylindrical recess 12 at the device-side end thereof.

Moreover, the internal thread 17 provided by way of a screw-in thread can clearly be seen. This is internally molded into the outer cylindrical surface of the recess 12, and is employed for the interlocking of a plugged-in or pluggable mating connector.

Figure 2C:
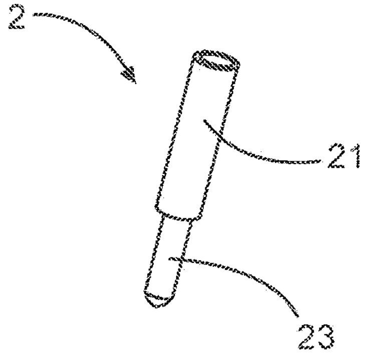
FIG. 2*c* shows a plug contact.

FIG. 2*c* shows a plug contact 2 which is to be inserted into the contact chamber, having a plug-in region 21 and a terminal region 23. The plug-in region 21 is configured in the form of a contact socket but, in another embodiment, could also be configured equally well as a contact pin.

In this exemplary embodiment, the terminal region 23 comprises a soldering pin.

In another exemplary embodiment, the terminal region is otherwise configured as a press-in terminal. The plug contact 2 will then be a press-in contact. This press-in variant is associated with a significantly reduced complexity of assembly, and is thus highly advantageous.

Figure 2D:
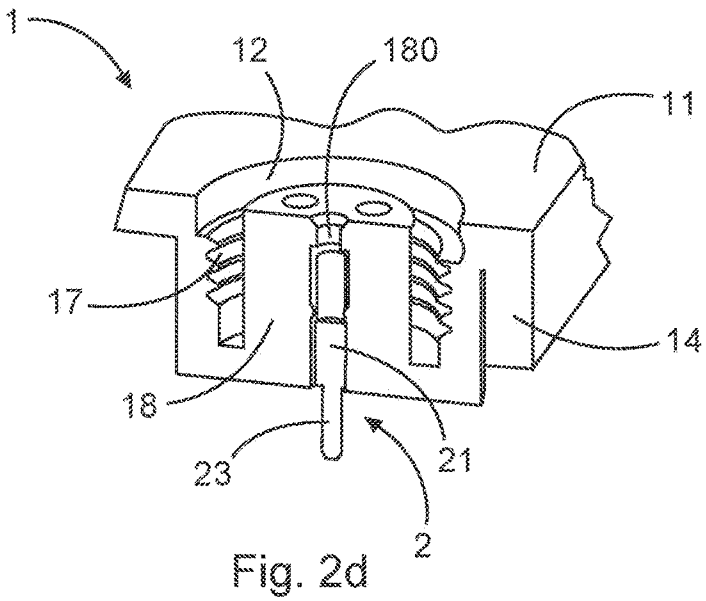
FIG. 2*d* shows the above-mentioned contact carrier, with a plug contact accommodated in one of its contact chambers.

FIG. 2*d* shows how the plug contact 2 is inserted into the contact carrier 18. To this end, particularly in mass production, it can be mechanically inserted into the contact chamber 180 and, in particular, can be latched into the contact chamber 180 of the contact carrier 18.

Moreover, it can again be clearly seen how the contact carrier 18 is configured in a recessed arrangement in the terminal section 11, namely within an essentially hollow cylindrical recess 12. In an alternative exemplary embodiment, for the interlocking of a mating connector, a latching collar or latching undercut can be arranged in the recess, in place of the thread.

Figure 3A:
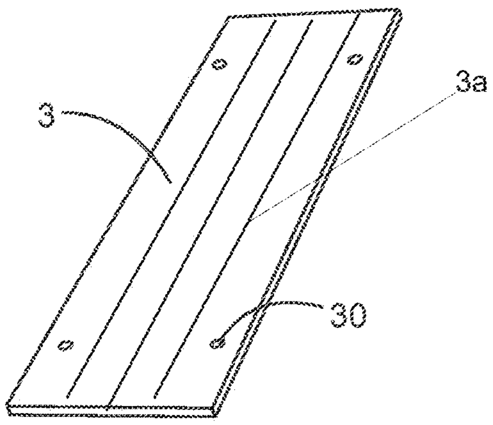
FIG. 3*a* shows a circuit board.

FIG. 3*a* shows a circuit carrier, which is embodied in the form of a circuit board 3, having electrical conducting tracks 3*a*, having four terminal cut-outs 30 arranged therein.

Figure 3B:
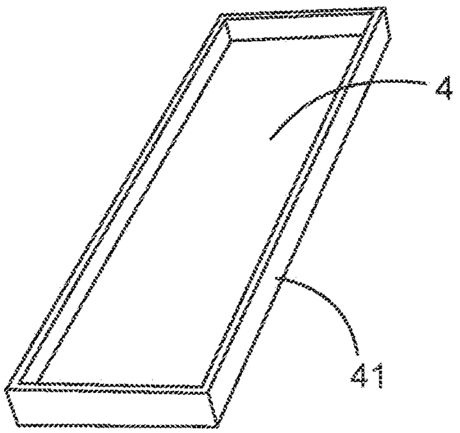
FIG. 3*b* shows a housing base part.

FIG. 3*b* shows a housing base part 4 with a circumferential base collar 41.

Figure 3C:
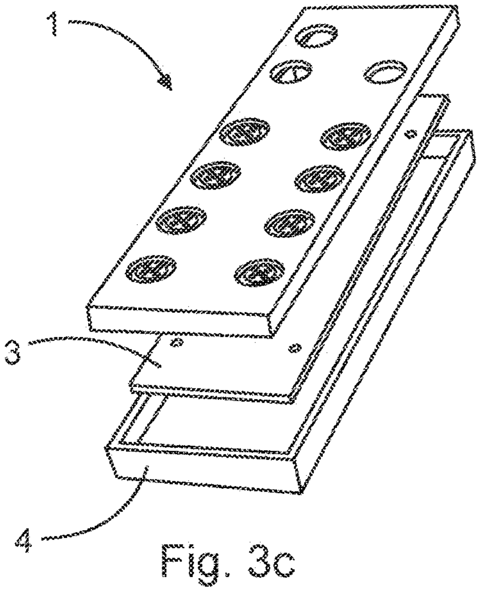
FIG. 3*c* shows the device connection part, in combination with the housing base part and the circuit board.
Figure 3D:
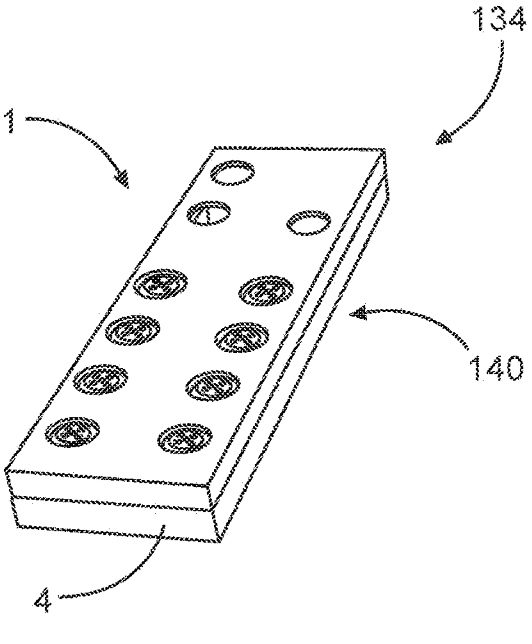
FIG. 3*d* shows an electrical device 134.

FIG. 3*c* shows the housing base part 4, with the circuit board 3 and the device connection part 1, as individual components FIG. 3*d* shows the above-mentioned components 1,3,4, with the plug contacts 2 inserted in the contact chambers 180 of the contact carriers 18 (albeit, in this representation, covered by the contact carriers 18, and thus not visible), in an assembled state. An electrical device 134 is thus formed wherein the device connection part 1 and the device base part 4, in combination, form the device housing 140. The vertically oriented sidewalls of the device housing 140 are partially formed by the collar 14 of the device connection part 1 and partially by the base collar 41 of the housing base part 4. Moreover, in the mounting openings 10 of the device connection part 1, optionally, the above-mentioned (unrepresented) separately configured plug connector can be installed, for example as a power terminal and/or as a network terminal.

Figure 4A:
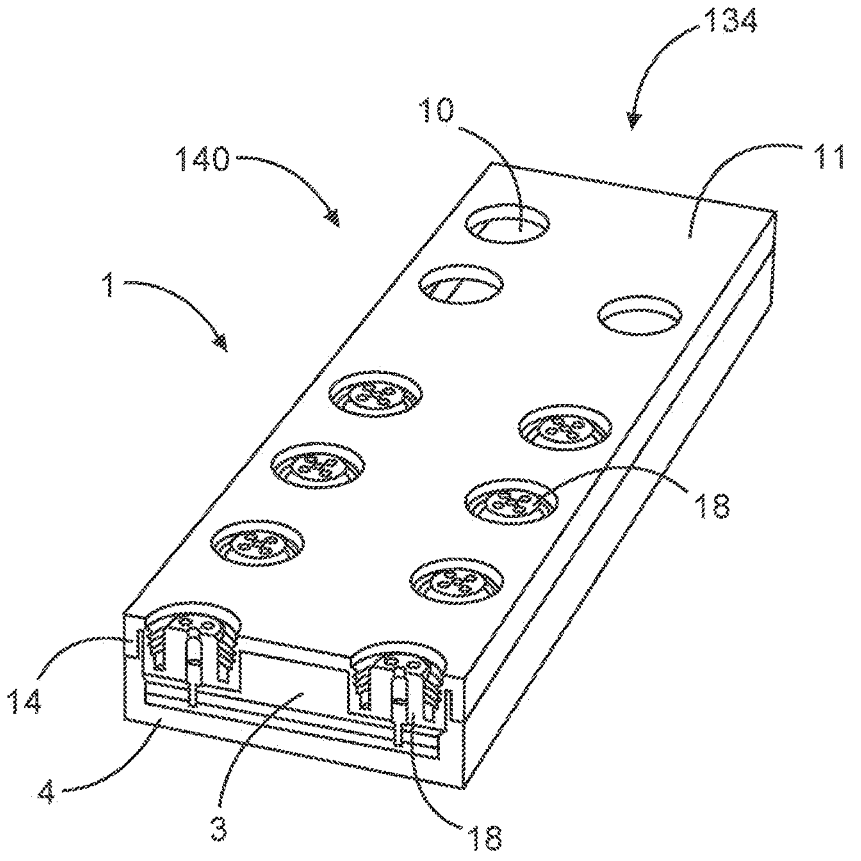
FIG. 4*a* shows the electrical device, in a sectional view through two contact carriers.
Figure 4B:
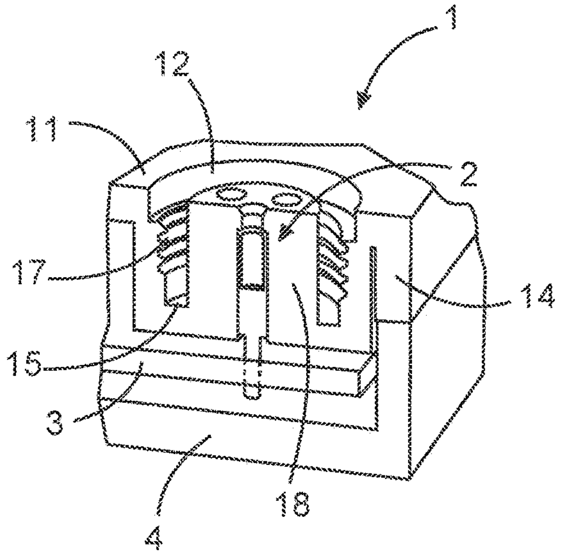
FIG. 4*b* shows a section of the preceding representation.

FIG. 4*a* shows the electrical device 134 in a sectional view through two contact carriers 18. The plug contact 2 thus represented is inserted in the central contact chamber 180 and retained therein and, at its terminal region 23 (not explicitly represented here, for reasons of space), penetrates the circuit board 3. To this end, the circuit board 3 has a through contact, which is configured as an electrically conductive internally coated through-opening. FIG. 4*b* shows an enlarged section, representing a contact carrier 18 from the preceding representation.

Figure 5A:
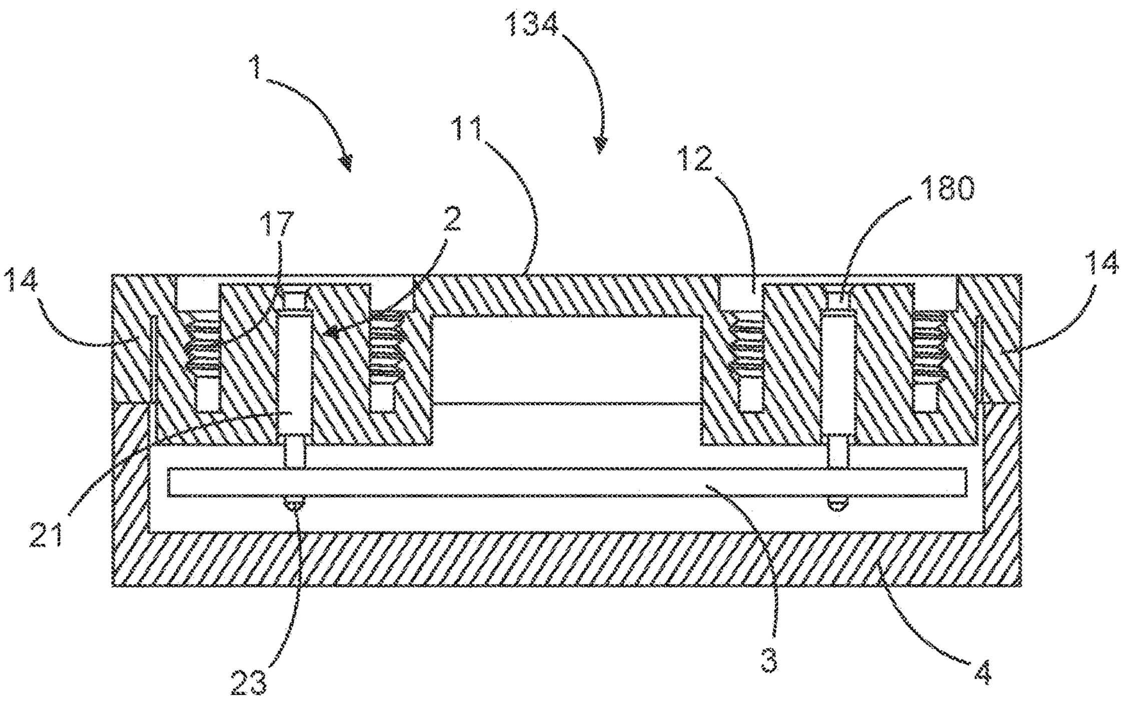
FIG. 5*a* shows a sectional representation of the electrical device, with a section plane running through the contact carriers.

FIG. 5*a* shows the electrical device 134 in a sectional representation, at a section through the two above-mentioned contact carriers 18. In this case, the terminal region 23 of the plug contact 2 is also explicitly identified by its reference number. The latter can be embodied in the form of a soldered contact, and soldered to the associated through-contact of the circuit board 3. In alternative embodiment, however, it can also be configured as a press-fit contact and, by the press-in method, is finally connected to the circuit board 3 in an electrically conductive and operationally secure manner by the press-fitting thereof into the through-contact.

Figure 5B:
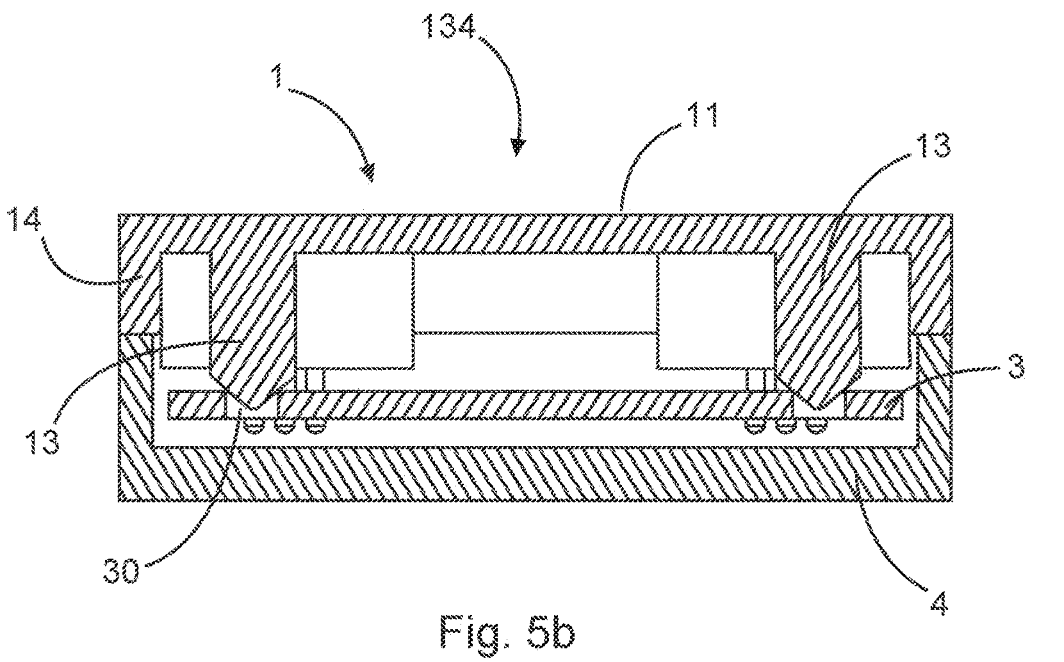
FIG. 5*b* shows a sectional representation of the electrical device, with a section plane running through the fastening studs.

FIG. 5*b* shows a further sectional representation of the electrical device 134 wherein, in this case, the plane section is oriented through two fastening studs 13 of the device terminal section 1. In this representation, the type of fastening of the circuit board 3 to the device connection part 1—and thus to the device housing 140—can be particularly clearly seen.

The fastening studs 13 have an end region with a conical clamping section, at which they are conically profiled up to their end. By means of this conical clamping section, they penetrate the respective clamping recess 30 in the circuit board 3, and are clamped therein. The circuit board 3 is thus held and secured in its final position on the device connection part 1—and thus in the device housing 140. This fastening method is particularly advantageous, as the associated complexity of assembly is extremely low. Finally, in this manner, by a single and simultaneous action, both the terminal regions 23 of the plug contacts 2 can be plugged into the through-contacts of the circuit board 3, and the circuit board 3 can be fastened to the device connection part 1.

Although respective combinations of various aspects or features of the invention are represented in the figures, it will be evident to a person skilled in the art—unless indicated otherwise—that the combinations represented and discussed are not the only combinations possible. In particular, mutually corresponding units or combinations of features from different exemplary embodiments can be mutually interchanged.

LIST OF REFERENCE NUMBERS

1 Device connection part
10 Mounting openings
11 Terminal section
12 Hollow cylindrical recess
13 Fastening studs
14 Collar/sidewall section of device housing
15 Connecting web
17 Internal thread
18 Contact carrier
180 Contact chambers
2 Plug contact
21 Plug-in region
23 Terminal region
3 Circuit board/circuit carrier
30 Clamping recesses
4 Housing base part
41 Base collar
134 Electrical device
140 Device housing

The invention claimed is:

1. An electrical device, comprising a device housing and at least one circuit carrier having electrical conducting tracks and a plurality of plug connectors, each of which comprises a contact carrier having a plurality of uninterrupted contact chambers and a plurality of electrical plug contacts, wherein the plug contacts, at their plug-in end, respectively comprise a plug-in region for plug-in side connection to mating contacts of a mating connector which is plugged into the respective plug connector and, at their terminal end, respectively comprise a terminal region at which they are connected, in an electrically conductive manner, to the conducting tracks of the circuit carrier, and wherein the plug contacts are respectively accommodated, at least partially, in one contact chamber of the respective contact carrier and are retained therein, wherein the electrical device further comprises a device connection part, which forms a housing part of the device housing, wherein the device connection part is configured integrally with the contact carriers, and further wherein the electrical device further comprises at least two further terminals, namely, a power supply terminal and at least one data network terminal, wherein these at least two terminals are formed by further separate and built-in plug connectors, each having a separate and further contact carrier and a further built-on plug connector housing, by which they can be fitted to mounting openings which are provided for this purpose in the device connection part.

2. The electrical device as claimed in claim 1, wherein the circuit carrier is fastened to the device connection part.

3. The electrical device as claimed in claim 1, wherein the circuit carrier comprises a plurality of through-contacts which are connected to the conducting tracks in an electrically conductive manner, which are embodied as electrically conductively-coated through-openings, wherein a.) the plug contacts are either embodied in the form of press-in contacts, wherein, at their terminal region, they respectively comprise a press-in pin, wherein the press-in contacts, at their press-in pins, are press-fitted into the respective through-contacts of the circuit carrier, or wherein b.) the plug contacts are embodied in the form of soldered contacts, wherein, at their terminal region, they comprise soldering pins, wherein the soldered contacts, at their soldering pins, are led through the respective through contacts of the circuit carrier and soldered thereto.

4. The electrical device as claimed in claim 1, wherein the circuit carrier is a circuit board.

5. The electrical device as claimed in claim 1, wherein the said plurality of plug connectors is at least four, such that at least four contact carriers are integrally configured with the device connection part.

6. The electrical device as claimed in claim 1, wherein the electrical device is a terminal device for a data network.

7. The electrical device as claimed in claim 1, wherein the device housing comprises a housing base part which, in combination with the device connection part, forms the device housing.

8. A device connection part for the electrical device as claimed in claim 1, wherein the device connection part comprises the above-mentioned contact carriers and is formed of an electrically insulating material, wherein each of the contact carriers comprises the above-mentioned plurality of uninterrupted contact chambers, into which the electrical plug contacts are insertable for bonding, on the terminal side, with conducting tracks of the circuit carrier of the electrical device in an electrically conductive manner, for the contact-connection thereof, on the plug-in side, with electrical mating contacts of a mating connector which is plugged or pluggable into the respective plug connector, wherein the device connection part comprises an essentially planar terminal section onto which the contact carriers are molded.

9. The device connection part as claimed in claim 8, wherein the contact carriers are configured in the terminal section in a recessed arrangement.

10. The device connection part as claimed in claim 8, wherein the device connection part is produced by an injection-molding process, and is thus embodied as an integral injection-molded part with the contact carriers which are molded thereon.

11. The device connection part as claimed in claim 8, wherein the device connection part forms at least one outer wall of the device housing.

12. The device connection part as claimed in claim 11, wherein the device connection part, at the terminal section, further comprises at least one edge or curvature, by which the device connection part additionally forms at least one part of at least one sidewall of the device housing, such that the device connection part forms an upper shell of the device housing.

13. The device connection part as claimed in claim 8, wherein the device connection part comprises the plug contacts which are secured in the contact chambers of the contact carriers.

14. The device connection part as claimed in claim 8, wherein the device connection part comprises a fastening apparatus for fastening the circuit carrier to the device connection part.

15. The device connection part as claimed in claim 14, wherein the fastening apparatus is comprised of a plurality of fastening studs which are either molded onto the device connection part, or are embodied as separate parts and fitted to the device connection part.

16. The device connection part as claimed in claim 8, wherein the device connection part, at its terminal section, comprises a plurality of mounting openings for the fitting of further separately embodied plug connectors.

17. A method for manufacturing an electrical device as claimed in claim 1, the steps of:

A. Injection-mold of at least one device connection part as a one-piece injection-molded part, which comprises contact carriers which are molded thereupon at their respective position;

B. gauging the relative position of the contact carriers of the at least one device connection part with respect to one another; and C. determining appropriate terminal positions on the circuit carrier from measurement data established in process step B, and the formation of at least one circuit carrier, with through-contacts at the terminal positions thus determined.

18. The method as claimed in claim 17, wherein the method further comprises the following steps:

D. Injection-mold device connection parts using the injection-molding tool, and populate the contact carriers with plug contacts, and produce the circuit carrier according to the terminal positions determined in process step C;

E. Terminal-side electrical contact connect the plug contacts with the respective circuit carrier, and fasten the respective circuit carrier to the respective device connection part;

F. Respective join the device connection parts with a housing base part of the device housing, wherein the circuit carrier is arranged in the device housing.

19. The method as claimed in claim 18 wherein, in process step D, the plug contacts are either over-molded during the injection-molding process or, further to the injection-molding process, are inserted into the contact chambers of the contact carriers.

20. The method as claimed in claim 18, wherein, in process step E, the following two steps are executed simultaneously:

E1.) for electrical contact-connection, the terminal regions of the plug contacts are led through the through-contacts in the respective circuit carrier, by a press-in or subsequent soldering arrangement and, at the same time E2.) fastening studs which are molded onto or applied to the device connection part respectively engage in an associated clamping recess in the respective circuit carrier, and are clamped therein.

* * * * *